Oct. 7, 1947.  L. H. VAN DELLEN  2,428,505
OPTICAL PROJECTION COMPARATOR
Filed Aug. 31, 1943  2 Sheets-Sheet 1
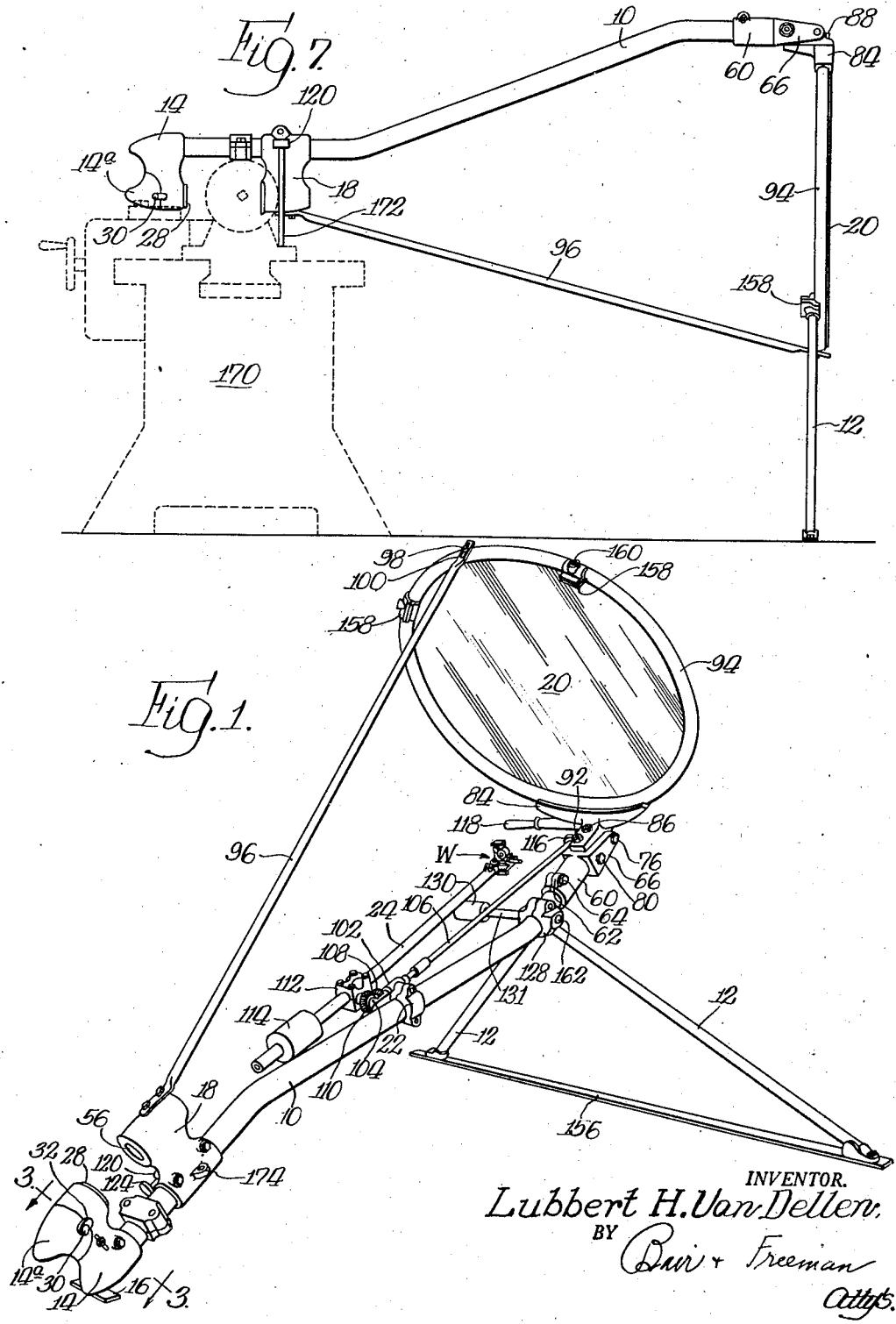
INVENTOR.
Lubbert H. Van Dellen.
BY Bair + Freeman
Attys.

Oct. 7, 1947. L. H. VAN DELLEN 2,428,505
OPTICAL PROJECTION COMPARATOR
Filed Aug. 31, 1943 2 Sheets-Sheet 2
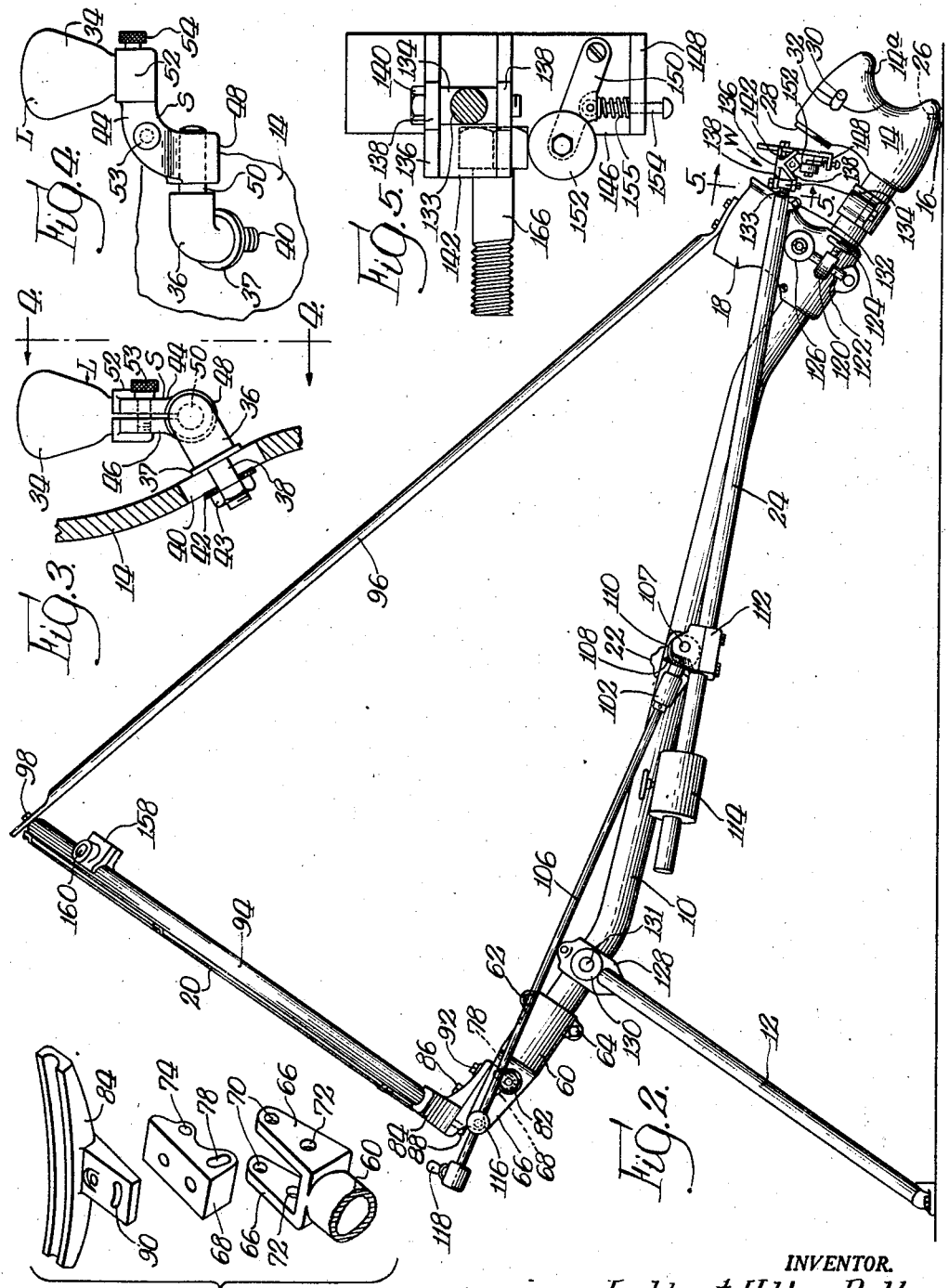

Patented Oct. 7, 1947

2,428,505

UNITED STATES PATENT OFFICE 2,428,505

OPTICAL PROJECTION COMPARATOR

Lubbert H. Van Dellen, Pella, Iowa

Application August 31, 1943, Serial No. 500,625

5 Claims. (Cl. 88—24)

My invention relates to an optical comparator, which is a device, whereby the image of an article can be thrown on a screen for purposes of inspection, comparison and study.

It is my object to provide an optical comparator, which is peculiarly adapted for use in industrial plants.

For example, with my apparatus, a threaded part, which is hard to measure in many respects, can be put into my work holder and an accurate image enlarged a certain number of times can be thrown on a screen where it can be inspected, studied and compared with drawings, templets and so on.

In my comparator, the image of an object, properly held between the lenses, can be thrown directly on a screen. This eliminates the use of a mirror and avoids the loss of light that the use of a mirror always entails. It also results in locating the screen a relatively long distance from the lenses. The user, in position to observe the image, particularly if on the far side of the screen from the lenses, then has the problem of quickly and conveniently mounting one object after another in a work-holder and moving it the relatively long distance to focus position between the lenses and then back to where the user can take it from the work-holder. This problem I have solved.

One of the particular purposes of my invention is to provide in such a device a work holder and means for mounting and operating it so that the user standing or sitting where he can observe the image on the screen and without moving away from that position can put a piece of work to be inspected into the work holder and then move that holder and the piece of work carried by it to position between the light source and the objective lens, so that the image can be thrown on the screen, and after inspection can operate the work holder to move the piece of work back to the user where it can be removed and another work piece substituted.

Thus the user of the device can put one piece of work after another into the work holder, move it to position for studying its image and move it back to unloading position without himself having to move from his place.

Another object is to provide such an apparatus so constructed that it can be moved about and used for inspecting the image of a piece of work carried by a machine tool, such for instance as a lathe without removing the work from the machine tool work holder.

Still a further object is to provide a variety of suitable adjustments for the parts of the optical comparator and to provide suitable means whereby it may be supported in various positions in which it may be usable.

It will be noted that one advantage of my structure lies in the arrangement which permits convenient viewing of the image from either side of the screen.

With these and other objects in view, my invention consists in the construction, arrangement and combination of the various parts of my optical comparator, whereby the objects contemplated are attained, as hereinafter more fully set forth, pointed out in my claims, and illustrated in the accompanying drawings, in which:

Figure 1 is a perspective view of an optical comparator embodying my invention.

Figure 2 is a side elevation of the same with the work holder in another position.

Figure 3 is a detail, sectional view taken on the line 3—3 of Figure 1 and omitting the clamping means for the removable part of the lamp holder casting.

Figure 4 is an elevation taken on the line 4—4 of Figure 3.

Figure 5 is an enlarged, detail, sectional view taken on the line 5—5 of Figure 2, illustrating the work holder.

Figure 6 is an exploded view, illustrating in perspective the parts whereby the screen is held on the supporting frame of the apparatus; and Figure 7 is an elevation of the apparatus in position for inspecting work held in a lathe with the usual work holder removed.

My device employs certain parts which are common to apparatus of this type, for instance a lamp holder, a source of light, a condenser lens, a work holder and objective lens and a screen.

Frame and general arrangement

For supporting the various parts, there is provided a frame, which may be of any form and material suitable for the purpose. In my drawings, I show a simple arrangement employing the pipe 10 and supporting legs 12. At one end of the pipe 10 is the casing 14, which serves as a lamp holder and condenser lens holder and may have a plate 16 to rest on the floor and form with the legs 12 a three-point support arrangement.

Spaced from the casing 14 on the pipe 10 is a casting 18, which among other things supports the objective lens. At the opposite end of the frame pipe 10 is the screen 20. On the pipe 10 intermediate its ends is a bracket 22, which supports the swinging work holder arm 24.

When the work to be observed is placed between the lamp and the objective lens as illustrated in Figure 2, the image of the work may be thrown on the screen 20.

I now proceed to a more detailed description of the parts of my device.

Lamp and condenser lens holder

The hollow casting 14 is secured to the rear end of the frame pipe 10. The plate 16 mentioned above may be secured to the casting 14 by screw bolts 26 to provide a supporting foot.

The condenser lens 28 is suitably mounted in the front part of the casting 14. The rear part of that casting has a removable cover part 14a, which may be locked in place by a screw bolt 30 extended through an ear 32 projecting from the main body of the casing 14 and overlapping the sides of the removable part 14a.

Inside the hollow casting 14 is a lamp holder L (Figure 3). This lamp holder is so constructed as to afford universal adjustment for a lamp bulb 34. The lamp holder L is a post 36, provided with a flange 37 resting against the inside surface of the wall of the casting 14. The post 36 has a stem 38 projecting through an elongated slot 40 in the wall of the casting 14. On the stem 38 outside the casting 14 is a washer 42 and a nut 43. By loosening the nut 43, the post 36 can be adjusted with relation to the slot 40.

A lamp holder socket S forming part of the lamp holder is made of two parts 44, 46, which are almost alike. At one end of them, they form a socket 48 to receive a stem 50 projecting from the post 36. At the other end, they form a socket proper 52. They are clamped together by means of a screw bolt 53. A set screw 54 can be used for locking the lamp in any position desired in the socket. Other means could be used for mounting the lamp for a variety of adjustments.

Objective lens holder

Mounted on the frame pipe 10 and spaced a short distance from the casting 14 is the objective lens holder 18, in which is the objective lens 56. Other features of the objective lens holder will be hereinafter referred to.

Screen mounting means

Mounted on the forward end of the pipe 10 is a casting 60 having a socket portion with a split end receiving the pipe 10. The split end is provided with the ears 62, which can be clamped together by means of suitable screws 64. At its forward end, the casting 60 is provided with forked ears 66. Mounted between the ears 60 for adjustment is a block 68. The ears 66 have spaced holes 70 and 72. The block 68 has a hole 74 through it, which hole may register with the holes 70 in the arms 66 to receive a bolt 76 (Figures 1 and 6). The block 68 has a curved elongated slot 78 extending through it to receive a bolt 80 received in the holes 72 and on which is a nut 82 shown in Figure 2. By loosening the nut 82 on the bolt 80, the block 68 can be rocked on the bolt 76 and by tightening the nut 82, the block can be clamped in any desired position.

Resting on the block 68 is a block 84, which is held to the block 68 by a bolt 86 (Figure 1), on which the block 84 may rock.

A bolt 88 (Figure 7) is mounted in the block 68 and extends upwardly through an elongated slot 90 in the block 84 and carries a nut 92. By loosening the nut 92, the block 84 can be rocked on the bolt 86 and the nut 92 may then be tightened.

The annular frame 94 for the screen is supported on the block 84.

By means of the parts 60, 68 and 84 as above described, the screen 20 carried by the frame member 94 may have universal adjustment about the optical axis of the apparatus.

This screen may be of any desired material.

It will be noted that the upper end of the frame 94 is braced by means of a rod 96, which is bolted to the object lens holder 18 and also bolted to the frame 94 by a bolt 98 extending through an elongated slot 100 in the rod 96. The bolt 98 can be loosened to permit the adjustments of the screen.

Work holder and its operating means

On the pipe 10 is a bracket 22 mentioned above, which has suitable bearings 102 and 104 for shafts 106 and 107 (Figures 1 and 2). On these shafts are the meshed beveled gears 108 and 110. Fixed to the outer end of the shaft 107 carrying the beveled gear 110 is a bracket 112, which carries the work holder arm 24 mentioned above. On one end of the work holder arm 24 is the work holder W and on the other end is an adjustable counterweight 114. The shaft 106 extends alongside the pipe 10 toward the front end of the apparatus and is journaled as at 116 and has fixed on its front end a handle 118, which can be swung over for rotating the shaft 106 and through the media of the gears 108, 110 and other parts, swinging the work holding arm 24 from position shown in Figure 1 to position shown in Figure 2 and back.

On the casing 18 is a bracket or the like 120 through which extends one arm of an angle rod 122, which is held in position by means of a set screw 124. On the other arm of the angle 122 is a rubber bumper sleeve 126, on which the work holding arm may rest for holding the work in position for inspection as illustrated in Figure 2.

On the pipe 10 is a clamp bracket 128 from which projects a similar rubber bumper 130 on which the arm 24 may rest when it is swung to its position shown in Figure 1.

The work holder W is perhaps best shown in Figures 2 and 5.

The arm 24 may be in the form of a pipe and its end carrying the work holder may be split and provided with the clamping ears 132 for clamping in the split end a short rod 133 (Figures 2 and 5), which has at its free end a tubular bearing 134.

A work holder bracket 136 has a couple of arms 138 which receive the bearing 134 between them. A bolt 140 extends through the arms 138 and the bearing 134. The work holder bracket 136 has a member or part 142 of any suitable shape to receive the work piece. The work holder bracket 136 also has a bracket arm 146 with a shelf 148 thereon. On the arm 146 is pivoted an arm 150 carrying at its free end a roller 152 for engaging the work piece and holding it in the holder proper 142. A headed rod 154 is pivoted to the arm 150 and slidably extends through the shelf 148 and is yieldably constrained toward the work holder proper 142 by a spring 154.

Supporting legs

The bracket 128 has threaded sockets to receive the ends of the legs 12 and the other ends of those legs, which are intended to rest on the floor may be connected by a cross bar 156.

On the frame 94 which holds the screen are fittings 158, which also have sockets 160 into which the ends of the legs 12 may be screwed. The bracket 128 has a socket 162 opposite the side where the rubber bumper 130 is shown in Figure 1 to receive the rod 131 of the rubber bumper 130, if it is desired to change the bumper so that it will project from the opposite side of the pipe 10.

*Operation*

I will now illustrate some of the ways in which my optical comparator may be used. It will, of course, be understood that there is a great variety of uses for an apparatus of this kind and the particular uses to which I refer are merely illustrative and are not intended to be inclusive.

Assumed that the parts are all adjusted and in place and that the lamp is lighted and that the work holder is in the position shown in Figure 1, the work holder device W is then adjacent to and accessible to any one who is using the apparatus and who is sitting or standing in position to watch the screen 20. The user can then put a work piece 166, which as is here shown is a threaded bolt in the work holder. (See for instance Figure 1 and Figure 2.) The user then grasps the handle 118 and swings it over for thereby rotating the shaft 106 and swinging the work holder arm 24 from the position of Figure 1 to its position of Figure 2. In the latter position, the work piece will be held between the lamp and the condenser lens 28 on the one side and the objective lens 56 on the other side, and in the optical axis of the machine. The image of the work piece will be cast upon the screen 20. Thereupon any study or comparison desired may be made. For example, the user of the apparatus may want to take a semi-transparent drawing on a tracing paper, hold it up against the image to determine whether the work piece truly and accurately conforms to the drawing.

By the use of this device, the work can be checked with great precision.

One of the great advantages of this device lies in the fact that many pieces of work can be checked at high speed, because the user of the device can put one piece into the work holder and move the work holder to image casting position, make the inspection, move the work holder back to loading position, remove the piece of work in the work holder and insert another, and all this can be done without any movement of the user from his original position.

It is obvious that the work holder supported on the work holder arm 24 may be changed for holding any kind of work piece the user may want to inspect.

One great advantage of this optical comparator arises from the fact that it can be conveniently moved from place to place around a plant and can be conveniently used wherever desired.

One feature of this ready mobility is illustrated in Figure 7, where I have shown the comparator set up for studying work held in the work holder of a machine tool, such as a lathe 170. The member 156 has been released from the legs 12, which can be readily done and the legs 12 have been removed from the bracket 128 and connected to the fittings 158 on the screen supporting frame 94. The whole device has then been turned upside down for bringing the castings 14 and 18 to position where the work on the lathe will be between them, where its image can be cast on the screen. For supporting one end of the apparatus on the lathe, I mount a threaded rod 172 in the threaded lug 174 on the casting 18 as shown in Figure 7.

It is obvious that when the work to be inspected is in the work holder of the lathe, the work holder W will not be needed.

Many changes may be made in a comparator of this kind, in the construction and arrangement of the parts, and the character of the material used, but it is my intention to cover by my claims any such changes which may be reasonably included within their scope and the scope of my invention.

I claim:

1. In an optical comparator, a supporting frame; a lamp holder, a pair of spaced lens holders and a screen, all supported on the frame, a work holder and a supporting arm therefor, said arm being pivoted at one end between the lens holders and the screen to swing the work holder from position between the lens holders to position convenient to be loaded by an operator near the screen, gearing mechanism adjacent the pivot point of the arm for swinging the arm, and an operating element for actuating the gearing mechanism from a point near the loading point of the work holder.

2. In an optical comparator, a lamp holder and a spaced lens holder, a pair of frame arms, mechanically associated with the holders and extending divergently therefrom, a screen adjustably mounted between the divergent ends of the arms, a work holder supported on one of the arms between the lens holder and the screen for permitting its work holder to move from position between the lamp and lens holders to position near the screen, and back, and an operating means for actuating the work holder from near the screen, and means for supporting the screen in raised position.

3. In an optical comparator, a frame having mounted thereon a screen, a spaced lamp holder and lamp, an objective lens holder and lens spaced from the lamp holder and spaced substantially from the screen in line between the lamp holder and screen, so that the image of an object located between the lamp holder and the lens holder may be thrown directly on the screen, an object holder movable from position adjacent the screen to position between the lamp holder and objective lens holder and back, an actuator located adjacent the screen for moving the object holder through its cycle of movements from position adjacent the screen to position between the lamp holder and objective lens holder and back.

4. In an optical comparator, a supporting frame, a screen thereon, a lamp holder mounted on the frame spaced substantially away from the screen, an objective lens holder mounted on the frame substantially spaced from the screen in line between the lamp holder and the screen so that the image of an object located between the lamp holder and the lens holder may be thrown directly on the screen, supporting legs, said frame and said screen mounting means, respectively, having means for interlocking rigidly with the legs so that the legs may project in different directions when connected to the frame or to the screen holding means, to hold the comparator either side up, a supporting plate on the comparator adjacent the lamp holder for supporting one end of the comparator when one side is up, and a supporting member detachably mountable on the frame adjacent the lamp holder for supporting one end of the comparator when the other side is up.

5. A unitary projection comparator apparatus having a tubular supporting means, a lamp holder mounted at one end of said means, a screen mounted on the other end of said means, an objective lens holder mounted on said means in line between the lamp holder and the screen, whereby the image of an object located between the lamp holder and the lens holder may be thrown directly on the screen, an object holder adjustably mounted on said means for permitting loading the object holder at one point and then adjusting it for locating the object between the lamp holder and the lens holder, supporting legs, means for adjustably rigidly connecting said legs with said means for holding the comparator one side up, and means for adjustably rigidly selectively connecting said legs with the screen for holding the comparator the other side up.

LUBBERT H. VAN DELLEN.

REFERENCES CITED

The following references are of record in the file of this patent:

UNITED STATES PATENTS

| Number | Name | Date |
| --- | --- | --- |
| 1,746,607 | Readeker | Feb. 11, 1930 |
| 1,460,600 | Palmer | July 3, 1923 |
| 1,717,063 | Readeker | June 11, 1929 |
| 1,589,349 | Bausch et al. | June 22, 1926 |
| 1,703,933 | Hartness et al. | Mar. 5, 1929 |
| 2,035,780 | Beardsley et al. | Mar. 31, 1936 |
| 1,305,406 | Peterson | June 3, 1919 |
| 2,197,308 | Kolb et al. | Apr. 16, 1940 |
| 2,192,529 | Thomas et al. | Mar. 5, 1940 |